UNITED STATES PATENT OFFICE.

JACOB G. W. MARTENS, OF NEW YORK, N. Y.

PAINT.

SPECIFICATION forming part of Letters Patent No. 434,798, dated August 19, 1890.

Application filed October 17, 1889. Serial No. 327,342. (No specimens.)

*To all whom it may concern:*

Be it known that I, JACOB G. W. MARTENS, of the city, county, and State of New York, have invented a new and useful Composition of Matter to be used as a Paint, of which the following is a specification.

The composition consists of the following ingredients combined in about the proportions stated: Bone-black, two pounds; soft-wood charcoal, one pound; hard-wood charcoal, one pound; red lead, one pound; boiled linseed-oil, one gallon; water, one quart; saltpeter, two ounces.

In order to prepare the composition I proceed as follows: The saltpeter is dissolved in one quart of water, and then the four pounds of finely-pulverized bone-black and charcoal are added and the mass is left to stand for a few days to thoroughly dissolve, after which the red lead is added. The whole substance is thoroughly mixed and then the linseed-oil added, slowly stirring the mass all the time.

The paint is then ready and can be used for all purposes for which paint is now used; but it is principally intended for coating the bottoms of ships to prevent barnacles from fastening on the same. It prevents iron and other metals when coated from rusting, and when applied to trees, wood, and other substances it preserves them from the elements and from insects.

Having thus described my invention, I claim as new and desire to secure by Letters Patent—

The herein-described composition of matter to be used as a paint, consisting of water, bone-black, charcoal, red lead, boiled linseed-oil, and saltpeter, in about the proportions specified.

JACOB G. W. MARTENS.

Witnesses:
 THEO. G. HOSTER,
 C. SEDGWICK.